United States Patent [19]
Pennella, Jr. et al.

[11] Patent Number: 4,484,845
[45] Date of Patent: Nov. 27, 1984

[54] MACHINE TOOL SAFETY SHIELD

[75] Inventors: Andrew J. Pennella, Jr., Milford, Conn.; Lawrence S. Benjamin, New York, N.Y.; Adolph G. Bergman, Keene, N.H.; William R. Jahnke, Fairfield, Conn.

[73] Assignee: Textron, Inc., Providence, R.I.

[21] Appl. No.: 448,968

[22] Filed: Dec. 13, 1982

[51] Int. Cl.³ .................. B23C 9/00; B23Q 11/08
[52] U.S. Cl. .................. 409/134; 29/DIG. 94; 51/272; 144/251 A; 408/241 G
[58] Field of Search .................. 409/134, 137; 408/241 G; 144/251 A, 251 R, 252 R, 252 A; 51/272, 274; 29/DIG. 50, DIG. 56, DIG. 94

[56] References Cited

U.S. PATENT DOCUMENTS

| | | | |
|---|---|---|---|
| 1,527,998 | 3/1925 | Serpico | 409/134 |
| 1,938,776 | 12/1933 | Nenninger et al. | 409/134 |
| 2,944,465 | 7/1960 | Jones | 408/241 G X |
| 3,703,124 | 11/1972 | Smith et al. | 409/134 |
| 3,786,846 | 1/1974 | Mehring | 144/251 A |
| 4,062,391 | 12/1977 | Piazzola | 144/251 A |
| 4,126,081 | 11/1978 | Zdeb | 409/134 |
| 4,162,647 | 7/1979 | Aslen | 409/134 |
| 4,397,342 | 8/1983 | North | 144/251 A X |

FOREIGN PATENT DOCUMENTS

| | | | |
|---|---|---|---|
| 131293 | 4/1951 | Sweden | 408/241 G |
| 574285 | 12/1945 | United Kingdom | 408/241 G |
| 586181 | 3/1947 | United Kingdom | 408/241 G |

*Primary Examiner*—Z. R. Bilinsky
*Attorney, Agent, or Firm*—Mattern, Ware, Stoltz & Fressola

[57] ABSTRACT

By providing a removable and repositionable panel member cooperatively mountable to a support panel in a plurality of alternate positions, which support panel is mountable to a machine tool, a unique, universally applicable safety shield is achieved. Preferably, the safety shield also incorporates a front panel pivotally mounted to the support panel, and constructed of cooperative mounted engagement of the removable and repositionable panel in a plurality of alternate positions therewith. If desired, a plurality of removable and repositionable panel members are employed to further enhance the alternate configurations obtainable using the safety shield of this invention.

19 Claims, 4 Drawing Figures

MACHINE TOOL SAFETY SHIELD

TECHNICAL FIELD

This invention relates to safety shields or guards, and more particularly to safety shields or guards which are removably mountable to machine tools.

BACKGROUND ART

Over the years, various guards or shields have been developed to provide a barrier between the cutter or bit of a machine tool and the machine operator, in order to reduce the possibility of injury. Typically, these guards or shields comprise fixed panels, pivotable panels, or slidable panels which are mounted to a support member, which is itself mounted to a non-rotating portion of the machine tool. Although these prior art guards or shields have provided some protection to the machine operators, these prior art shields are incapable of being universally employable, due to the wide variety of parts which can be machined by a particular machine tool.

Consequently, during actual applications, prior art machine guards or shields are either not employed by the operators or are moved into positions wherein their panels have little or no effect in performing the guarding function for which the shield was intended.

One major defect found in prior art machine tool guards or shields is the limited adjustability which the panels thereof can achieve. U.S. Pat. Nos. 4,126,081 and 4,162,647 show the best known prior art shields with their limited flexibility and limited versatility. In U.S. Pat. No. 4,126,081, the sides of the shield are merely pivotable about a single axis, while the shield of U.S. Pat. No. 4,162,647 has sides capable of only vertical or horizontal movement in a single plane.

Consequently, it is a principal object of the present invention to provide a machine tool shield which is capable of being readily mounted to any desired machine tool and which incorporates panels which are removably repositionable and universally readjustable to provide optimum shielding protection regardless of the configuration of the part being machined.

Another object of the present invention is to provide a machine tool shield having the characteristic features defined above which is readily installable on both horizontal and vertical machine tools such as millers, grinders, lathes, and the like.

Another object of the present invention is to provide a machine tool shield having the characteristic features defined above which incorporates panel members which are quickly and easily repositionable in a plurality of alternate configurations, thereby accommodating many different workpiece parts while also providing shield protection regardless of the part configuration.

Another object of the present invention is to provide a machine tool shield having the characteristic features defined above which also incorporates pivotable panels in order to further enhance the universality of the shield.

Other and more specific objects will in part be obvious and will in part appear hereinafter.

BRIEF DISCLOSURE OF THE INVENTION

The machine tool shield of the present invention overcomes all of the prior art drawbacks and limitations by providing a support panel which is quickly and easily mounted to the machine tool and a plurality of guard panels which are removably and cooperatingly associated with the support panel and are repositionable in a plurality of alternate locations and orientations. As a result, the machine tool shield of the present invention is changeable into a plurality of alternate configurations, sizes and shapes by merely removing and repositioning any one of the removable guard panels into one of its alternate positions.

In this way, the machine tool shield of this invention is capable of having the overall size and shape of its effective shielding envelope repeatedly reconfigured in order to meet the particular requirements of the part being machined. Consequently, regardless of the configuration of the machine tool part, the machine tool shield of this invention can be set with a particular configuration which will provide the desired, optimum shielding without interfering with the operation of the machine tool.

In the preferred embodiment, the machine tool shield of the present invention incorporates an anchor panel which is quickly and easily mountable to the non-rotating portion of the machine tool, with the rotating collet-tool holder portion thereof extending through aperture means formed in the anchor panel. In addition, front and rear guard panels are pivotally mounted to the anchor panel in a manner which allows each of said guard panels to be independently moved through an arc of at least 180 degrees. In order to enhance the protective qualities of the machine tool shield, the forward panel and the anchor panel incorporate a plurality of screw-receiving, threaded insert means mounted therein in various locations, with the screw-receiving, threaded insert means being positioned for receiving and anchoring the removable and repositionable panel guards.

In the preferred embodiment, two removable, repositionable guard panel members are employed, both of which are constructed for removable, cooperating engagement with the pivotable front panel as well as for removable, cooperating engagement with the anchor panel in alternate configurations and positions. In this way, the removable and repositionable guard panel members are capable of being mounted to either the anchor panel or the pivotable front panel in various alterable positions and locations with ease and simplicity. As a result, the machine tool shield of the present invention is capable of being completely and totally reconfigured as to its overall dimensional appearance in order to accommodate and provide protective shielding for the operator with any particular machine part configuration for which the machine tool is being employed.

The invention accordingly comprises an article of manufacture, possessing the features, properties and the relation of elements which will be exemplified in the article hereinafter described, and the scope of the invention will be indicated in the claims.

DESCRIPTION OF THE DRAWINGS

For a fuller understanding of the nature and objects of the invention, reference should be had to the following detailed description taken in connection with the accompanying drawings in which.

BEST MODE FOR CARRYING OUT THE INVENTION

Figure 1:
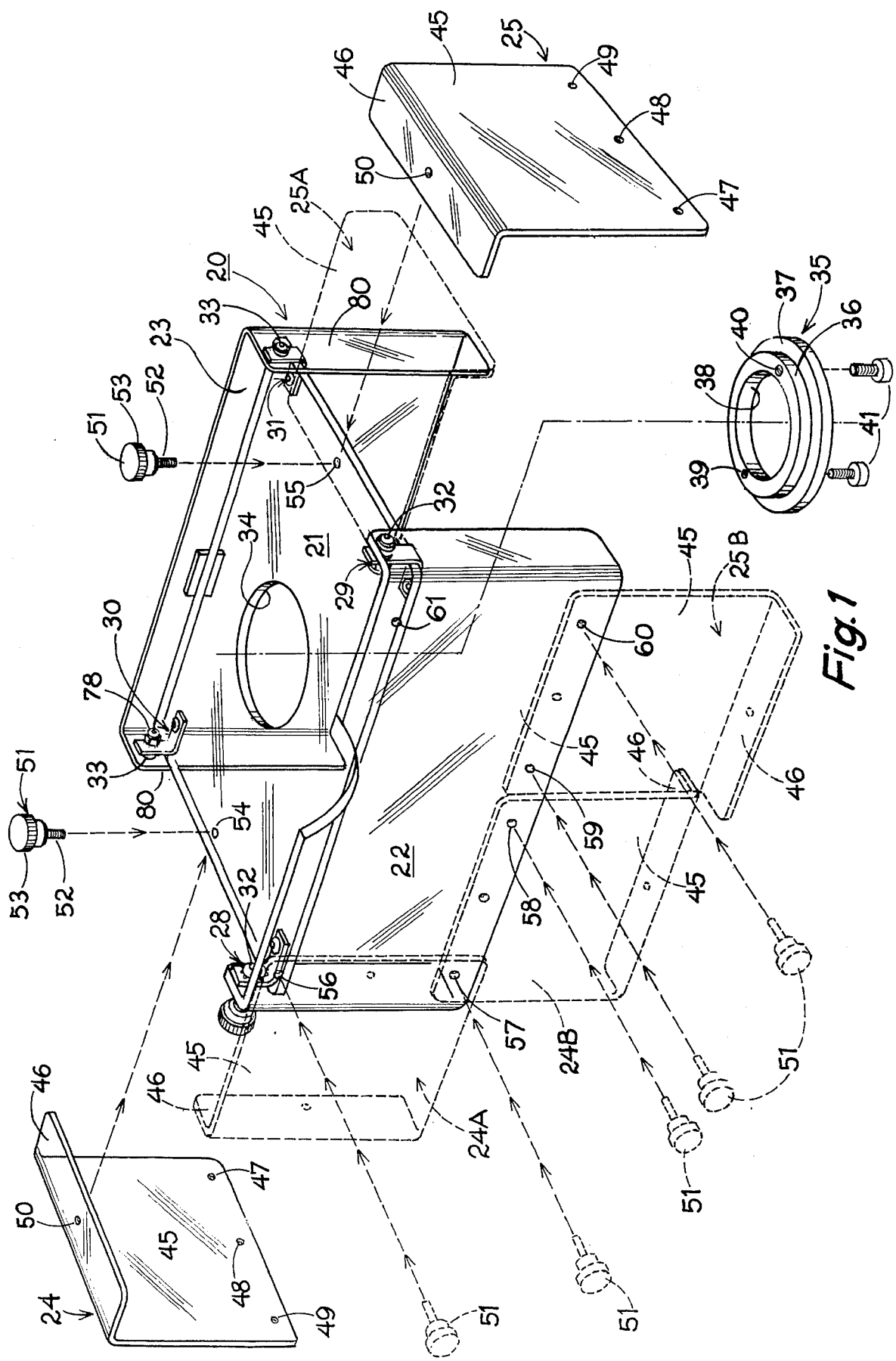
FIG. 1 is an exploded perspective view of the machine tool shield of the present invention showing the removable, repositionable panel members depicted, in phantom, in some of the various alternate positions in which the panel members may be placed.

In FIG. 1, the preferred embodiment of machine tool shield 20 of the present invention is shown incorporating an anchor panel 21, a front panel 22, and a rear panel 23. In addition, machine tool shield 20 also incorporates a pair of removable, repositionable panel members 24 and 25.

As shown in FIG. 1, front panel 22 is mounted to anchor panel 21 by bracket assemblies 28 and 29. Similarly, rear panel 23 is mounted to anchor panel 21 by bracket assemblies 30 and 31. As will be more fully described below, bracket assemblies 28, 29, 30 and 31 are constructed to provide pivoting movability to front panel 22 and rear panel 23 relative to anchor panel 21. In the preferred construction, the axis about which front panel 22 is pivotable is established by the axially aligned screw means 32 of bracket assemblies 28 and 29 which are also employed to secure front panel 22 to bracket assemblies 28 and 29. Similarly, the axis about which rear panel 23 is able to pivot is established by screw means 33 of bracket assemblies 30 and 31 which also secure rear panel 23 to bracket assemblies 30 and 31.

Figure 3:
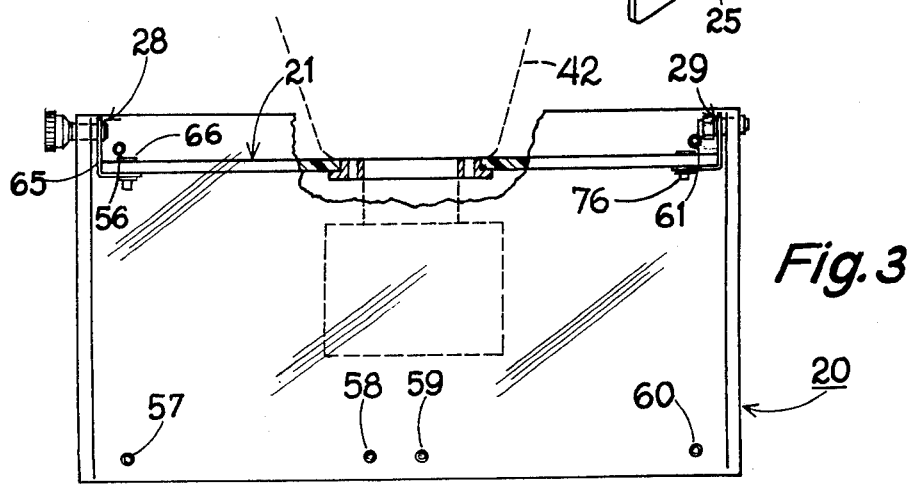
FIG. 3 is a front elevation view of a machine tool shield of the present invention shown mounted in position to a vertical machine tool, without the removable panels.

In the preferred embodiment, anchor panel 21 incorporates an enlarged aperture 34 which is dimensioned for cooperating engagement with a reinforcing mounting ring 35. As shown in FIGS. 1 and 3, mounting ring 35 incorporates a central portion 36, which comprises an outer diameter substantially equivalent to the inside diameter of aperture 34, and an annular panel-engaging outer flange portion 37, radially extending from central portion 36. In addition, central portion 36 incorporates an enlarged aperture 38 and two diametrically opposed screw receiving apertures 39 and 40.

In the preferred construction, reinforcing mounting ring 35 is positioned in cooperative engagement with anchor plate 21 by inserting central portion 36 of ring 35 in aperture 34 of anchor panel 21. In this way, outer portion 37 of ring 35 is in abutting, supporting engagement with anchor panel 21. Anchor plate 21 and ring 35 are quickly and easily securely mounted to the particular machine tool by employing fastening means such as screws 41 which are inserted through apertures 39 and 40, with the fastening means being threadedly engaged with the non-rotating quill portion 42 of the machine tool to which shield 20 is to be secured. In this way, machine tool shield 20 of the present invention is quickly and easily securely mounted to any desired machine tool, whether the machine tool be vertically or horizontally arranged, with machine tool shield 20, once in position, ready to provide the desired protection to the machine operator.

In addition, since anchor panel 21 is securely mounted in position by sandwiched engagement between ring 35 and quill 42, anchor panel 21 is pivotable relative to the central axis of quill 42 into parallelism with the direction of table travel, or into any desired angular orientation, prior to being securely mounted to quill 42. This sandwiched, secure engagement is assured by constructing the aperture engaging upper part of central portion 36 of ring 35 with an axial thickness which is less than the thickness of support panel 21, thereby assuring clamped engagement of panel 21 between ring 35 and quill 42. By employing this construction, the universality and versatility of the present invention is further enhanced since shield 20 is angularly positionable about the axis defined by quill 42 in any orientation in order to accommodate any workpiece configuration.

A further advantage of this construction is the ability of shield 20 to be angularly adjusted relative to the central axis of quill 42 without having to remove or support shield 20 during the angular orientation changes. Since screws 41 are threadedly engaged with quill 42 of the machine tool, shield 20 can be angularly repositioned at any time while being securely supportingly maintained by ring 35, even though screws 35 have been loosened to allow shield 20 to be pivoted into any other desired position. Then, once in the desired position, screws 41 are tightened, thereby securely sandwiching anchor panel 21 between ring 35 and quill 42. In this way, position changes can be made quickly and easily without requiring additional support or holding of shield 20 in order to place shield 20 in the desired configuration.

Also, by employing ring 35, pre-manufactured quills can be retrofitted quickly and accurately for secure mounted installation of shield 20 of the present invention therewith. By merely positioning ring 35 in the desired location on a quill of a pre-existing machine tool, the precise location and orientation of receiving holes can be accurately marked. Then, the receiving holes for screws 41 can be drilled and tapped in the quill. If desired, ring 35 can be employed as a guide to assure the proper orientation and position of the holes during drilling or tapping of the quill.

If desired anchor panel 21 may incorporate two diametrically opposed screw receiving holes on opposite sides of aperture 34. Using this construction, machine tool shield 20 is capable of being quickly and securely mounted to any desired machine tool by merely positioning the rotating portion of the machine tool through enlarged aperture 34 and securely fastening anchor panel 21 directly to the machine tool by screws 41, which are inserted through receiving holes formed in anchor panel 21 and threadedly engaged with the non-rotating portion of the machine tool.

In the preferred embodiment, machine tool shield 20 of the present invention incorporates two removable, repositionable panel members 24 and 25. Although panel members 24 and 25 may be formed in a plurality of alternate shapes or configurations, the preferred shape for panel members 24 and 25 is substantially L-shape in cross-section, with panel members 24 and 25 each comprising an enlarged, substantially flat, shield portion 45 and a cooperating, substantially smaller, flange portion 46, preferably at right angles to shield portion 45. Shield portion 45 also incorporates three screw-receiving apertures 47, 48 and 49 formed along the free edge thereof, opposite the location of flange portion 46, with the apertures preferably aligned along a single row in spaced relationship to each other. Flange portion 46, preferably incorporates a single, screw-receiving aperture 50 positioned substantially midway along the length thereof.

In order to provide the desired securement of removable, repositionable panel members 24 and 25 in the various alternate locations in which panel members 24 and 25 may be placed, machine tool shield 20 of the present invention also incorporates a plurality of thumb screw 51, each of which comprise a threaded screw portion 52 and a head portion 53. In addition, machine tool shield 20 also incorporates a plurality of screw-receiving, threaded insert means positioned about shield 20 for threaded engagement with the thumb screw 51 for secure, mounted engagement of the panel members 24 or 25 therewith.

Figure 4:
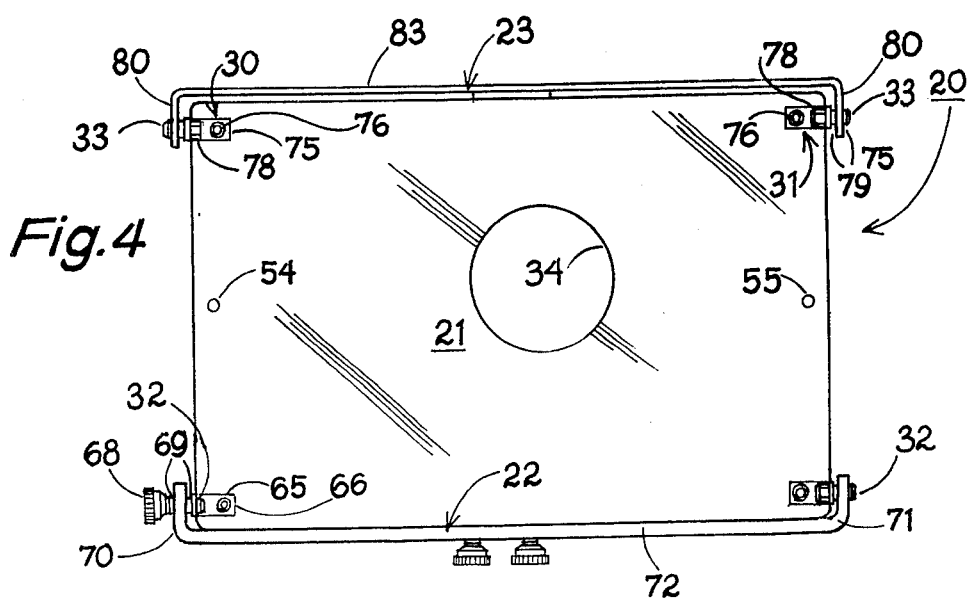
FIG. 4 is a top plan view of the machine tool shield of the present invention without the removable panels.

As best seen in FIGS. 1 and 4, anchor panel 21 incorporates two threaded insert means 54 and 55. Threaded insert means 54 is positioned substantially midway along one side edge of anchor panel 21, while threaded insert means 55 is positioned substantially midway along the opposite side edge of anchor panel 21. The precise location of insert means 54 and 55 is determined by the position of aperture 50 of flange portion 46 and the position of aperture 48 of shield portion 45. In order for panel members 24 and 25 to be mountable to anchor plate 21 in a plurality of alternate orientations, apertures 48 and 50 of panel members 24 and 25 must be alignable with insert means 54 and 55 to attain interconnected, securely mounted engagement of thumb screw 51 therewith.

As shown in FIGS. 1 and 3, front panel 22 incorporates six screw receiving, threaded insert means 56, 57, 58, 59, 60 and 61. Preferably, screw receiving means 57, 58, 59 and 60 are positioned along the bottom edge of front panel 22, while screw receiving means 56 and 61 are positioned in upper, opposite corners of front panel 22. Threaded insert means 56 and 57; 57 and 58; 59 and 60 and 60 and 61 are spaced apart from each other a distance equal to the spacing between apertures 47 and 49 of panel members 24 and 25. In this way, mounted engagement of panel members 24 and 25 to front panel 22 is achieved in a plurality of alternate positions, some of which are depicted in FIG. 1, is assured.

In FIG. 1, the principal alternate positions in which panel members 24 and 25 may be securely mounted to anchor panel 21 and front panel 22 are shown. In one of these alternate positions, also shown in FIG. 2, panel members 24 and 25 are securely mounted to anchor panel 21 by positioning flange portion 46 of panel members 24 and 25 along the side edges of anchor panel 21 between the terminating edges of front panel 22 and rear panel 23. In this position, aperture 50 of panel member 24 is axially aligned with screw receiving, threaded insert means 54, enabling panel member 24 to be secured in this position by threaded portion 52 of thumb screw 51, which extends through aperture 50 and is threadedly engaged with threaded insert means 54. In this way, flange portion 46 of panel member 24 is securely mounted to anchor panel 21, held in place by head portion 53 of thumb screw 51.

Similarly, panel member 25 is securely mounted to the opposite side edge of anchor panel 21, with threaded portion 52 of thumb screw 51 passing through aperture 50 of panel member 25, by threadedly engaging threaded portion 52 of thumb screw 51 in threaded insert means 55, while the head portion 53 of thumb screw 51 engages panel 25 and securely maintains panel 25 in the desired position.

In this configuration, machine tool shield 20 comprises an overall rectangular parallelepiped shape, with panel shield members peripherally surrounding and defining the entire outer peripheral surface thereof. This configuration represents the typical configuration commonly found with most prior art machine tool shields or guards.

However, by employing the teaching of the present invention, the machine tool shield of this invention is not limited to this single configuration, but is capable of being reconstructed into a plurality of alternate configurations. These alternate configurations, which will be discussed in detail below, are shown in phantom in FIG. 1, with panel members 24 and 25 each being shown in different positions. However, as is readily apparent from this description, panel members 24 and 25 can be, and typically would be, both placed in identical, cooperating orientations.

One of the major alternate positions for panel members 24 and 25 of machine tool shield 20 is depicted in FIG. 1 by panel member 25A. In this position, panel member 25A is securely mounted to anchor panel 21 along its side edge thereof, between the terminating edges of front panel 22 and rear panel 23. However, in this configuration, the substantially flat, shield portion 45 of side panel member 25 is securely mounted to anchor panel 21 by thumb screw 51 threadedly engaging threaded insert means 55 after passage of thumb screw 51 through hole 48 of panel member 25A. As discussed above, if desired, panel member 24 could be mounted in a corresponding position along the opposite side edge of anchor panel 21. In this configuration, machine tool shield 20 of the present invention can easily accommodate the machining of a longitudinal elongated part, while still providing the desired shielding both forwardly, rearwardly and upwardly.

Another alternate position in which side panels 24 and 25 can be mounted is depicted in FIG. 1 by side panel 24A. In this position, side panel 24A is mounted with its enlarged, substantially flat, shield portion 45 secured along its free edge to the side edge of front panel 22. This position is easily attained by inserting thumb screw 51 through holes 47 and 49 of panel member 24A, with thumb screw 51 being threadedly engaged with threaded insert means 56 and 57 of front panel 22, thereby securely mounting panel member 24A to front panel 22. As discussed above, threaded insert means 56 and 57 are spaced apart the same distance as apertures 47 and 49 of panel member 24. Consequently, the mounted engagement of panel member 24A to front panel 22 in the position shown is attained quickly and easily.

If desired, panel member 24A could be mounted to front panel 22 in substantially the identical position and in substantially the identical manner as shown, with flange portion 46 extending forwardly instead of rearwardly as depicted in FIG. 1. To attain this alternate position, aperture 47 is aligned with threaded insert 56, instead of insert 57, and aperture 49 is aligned with threaded insert 57, instead of insert 56.

Two further alternate positions in which panel members 24 and 25 can be mounted are also depicted in FIG. 1 as shown by panel members 24B and 25B. In both of these configurations, the enlarged, substantially planar, shield portions 45 of panel members 24B and 25B are both mounted along the bottom edge of front panel 22. In order to mount panel member 24B securely in position, as shown, threaded portion 52 of a first thumb screw 51 is inserted through aperture 49 of panel member 24B and is then threadedly engaged with aligned threaded insert means 57. Threaded portion 52 of a second thumb screw 51 are inserted through aperture 47 of panel member 24B and into threaded engagement with aligned threaded insert means 58. Then, the head portion 53 of thumb screw 51 is brought into holding engagement with panel member 24B. When securely mounted in position, panel member 24B is ready for protective shielding with flange portion 46 extending towards the cutting tool.

In an alternate position as depicted by panel member 25B, flange portion 46 extends forwardly, away from the cutting tool. In order to mount panel member 24B securely in position as depicted in FIG. 1, aperture 47 is aligned with threaded insert means 60. Then, thumb screw 51 are secured to front panel 22 in insert means 59 and 60, securely retaining panel members 25B in position.

As is readily apparent from the preceding description, readily removable, repositionable panel members 24 and 25 can be quickly and easily securely mounted to anchor panel 21 or front panel 22 of machine tool shield 20 in a plurality of alternate positions and configurations. In this way, the overall dimensional appearance and shielding capability of machine tool shield 20 is widely varied and, as a result, greatly enhanced.

As is apparent from this description, the removable, repositionable panel members allow the entire machine tool shield 20 to be completely reconfigured in order to accommodate and achieve desired shielding for any workpiece, regardless of the shape, size, or configuration of the workpiece. This flexibility is further enhanced by the pivoting capability of front panel 22 and rear panel 23.

Figure 2:
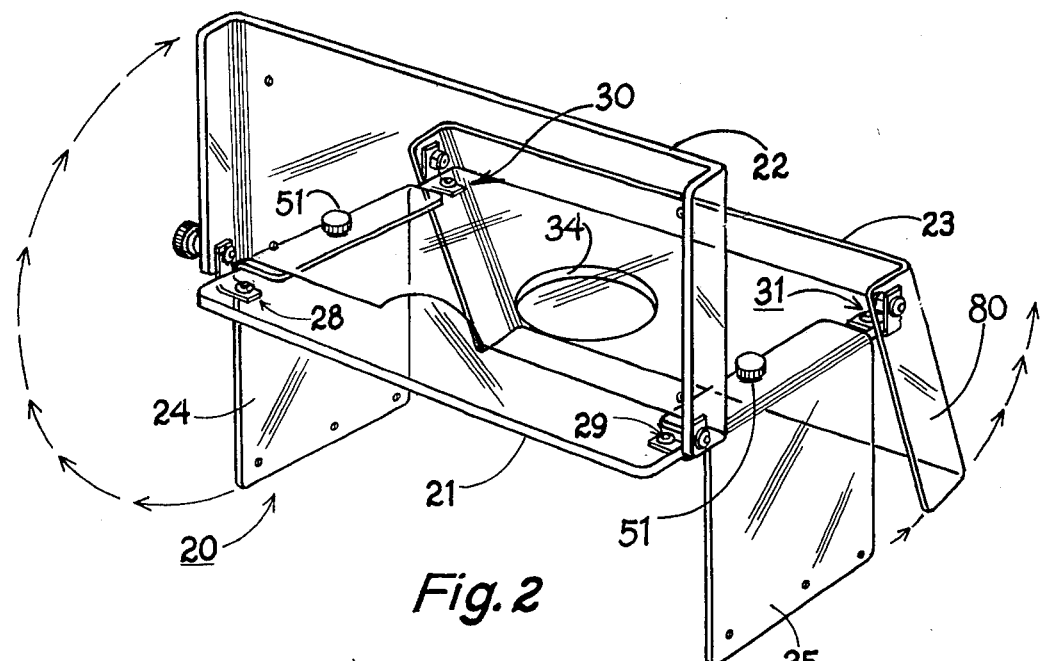
FIG. 2 is a perspective view of the machine tool shield of the present invention with the front and rear panels shown in alternate pivoted positions.

As shown in FIG. 2, both front panel 22 and rear panel 23 are capable of pivoting movement through an arc of rotation of about 180 degrees. The axis about which front panel 22 pivots is defined by the axis of screw members 32 of holding means 28 and 29. The axis about which rear panel 23 pivots is defined by screw members 33 of holding means 30 and 31.

By referring to FIGS. 2-4, the preferred embodiment for pivotally interconnecting front panel 22 and rear panel 23 to anchor panel 21 can best be understood. As shown in these drawings, front panel 22 is mounted to anchor panel 21 by bracket means 28 and 29. In its preferred embodiment, bracket means 28 and 29 each incorporate an L-shaped angle bracket member 65 with aperture means formed on both legs thereof for the receipt of mounting means. In the preferred embodiment, L-shaped bracket 65 is positioned along the underside of anchor panel 21 and is securely mounted thereto by fastening pin or rivet 66. The other leg of bracket 65 incorporates pivot axis defining screw member 32.

Preferably, front panel 22 incorporates side flanges 70 which are blended with forward facing panel portion 72 in order to achieve a panel member having smooth, continuous, rounded side edges. Each side flange 70 incorporates an aperture adjacent its upper terminating end, which is positioned for cooperative, aligned engagement with screw member 32. With pivot axis defining screw member 32 inserted through L-shaped bracket 65 and extending therefrom through the aperture formed in flange 70 of front panel 22, front panel 22 attains the pivoting adaptability desired.

In the preferred embodiment, in order to assure controlled pivoting engagement of front panel 22 relative to anchor panel 21, while also providing assurance that front panel 22 is maintainable in any desired position, a lock nut 67 is threadedly mounted to screw member 32 as depicted by bracket means 29. On the opposite side of front panel 22, and depicted by bracket means 28, a panel-locking adjustment knob 68 is threadedly mounted to screw member 32. In addition, nylon washers 69 are mounted on opposed sides of flange 70, in order to provide the desired frictional, holding or locking engagement of front panel 22 in each of its various pivoted positions.

With this configuration, front panel 22 is free to pivot about the axis defined by threaded screw member 32 by merely moving front panel 22 relative to anchor panel 21. However, once front panel 22 has been pivoted into a desired position, front panel 22 will automatically remain in that position and, if desired, can be easily locked in this position by tightening adjustment knob 68 into advanced threaded engagement with screw member 32. By threadedly advancing knob 68 into further engagement with screw member 32, nylon washers 69 are brought into increased frictional engagement with both sides of flange 70. Once this frictional engagement has reached a desired level, further movement of front panel 22 will be prevented until adjustment knob 68 has been rotated in the opposite direction, thereby reducing the frictional engagement of washers 69 with flange 70.

Rear panel 23 is pivotally mounted to anchor panel 21 in a fashion similar to that described above in reference to front panel 22. However, it has been found that a position locking adjustment capability is not necessary for rear panel 23. Consequently, both bracket means 30 and 31 are constructed substantially identical to bracket means 29.

In the preferred embodiment, bracket means 30 and 31 each incorporate an L-shaped bracket member 75 with one leg thereof securely mounted to the underside of anchor panel 21 by securement pin 76. Since rear panel 23 is preferably constructed in a configuration similar to front panel 22, rear panel 23 incorporates side flanges 80 which extend forwardly from rearward facing portion 83. Side flanges 80 of rear panel 23 incorporate apertures which are aligned for cooperation with bracket members 75 and inserted engagement with screw members 33.

In this way, pivot axis defining screw members 33 extend from the outside surface of flanges 80 through the apertures formed therein, as well as through the accommodating hole formed in the upstanding portion of bracket 75. At the terminating end of screw members 33, nuts 78 are threadedly engaged thereon to securely retain the thumb screw in position.

In addition, nylon washers 79 are preferably positioned on both sides of flanges 80 in order to impart the desired frictional resistance to the movement of rear panel 23. This frictional resistance assures that rear panel 23 is easily pivoted through its entire arcuate travel distance of about one hundred eighty degrees, while also remaining fixed in any of its various positions whenever the pivoting force is removed.

In order to minimize cost, rear panel 23 is preferably thinner than the other panel members. However, this dimensional construction makes rear panel 23 susceptible to vibration. Consequently, rear panel 23 preferably incorporates a vibration dampening pad 43, which substantially eliminates any vibration of rear panel 23.

As is readily apparent from this description, both front panel 22 and rear panel 23 are capable of being pivoted through an arcuate distance of about one hundred eighty degrees about an axis which is spaced inwardly from the edges of anchor panel 21, as well as spaced above the surface of anchor panel 21. As a result, as best seen in FIG. 2, front panel 22 and rear panel 23 can be pivoted through a complete arc of at least one hundred eighty degrees while employing comparatively inexpensive securement and pivoting interconnecting means. Consequently, great flexibility is provided, while also maintaining cost at a minimum.

It will best be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A safety shield for mounting to a machine tool which incorporates a non-rotating portion having a rotating cutting tool extending therefrom, said safety shield comprising:
   (A) a support panel mounted to the non-rotating portion of the machine tool and incorporating
      (1) aperture means for peripherally surrounding the rotating cutting tool, and
      (2) fastening means mounted along at least one side edge of the support panel;
   (B) a first panel pivotally mounted to the support panel;
   (C) a second panel
      (1) removably attached to the support panel,
      (2) selectively securable to the support panel in a plurality of alternate orientations and positions for extending the zone of protection afforded thereby to conform to the particular needs of the user, and
      (3) incorporating fastening alignment means formed therein along at least two sides thereof for cooperative interconnected engagement with the fastening means to assure secure mounting of the second panel to the support panel in any one of its selective positions; and:
   (D) cooperating fastening means
      (1) associated with the second panel and the support panel for securely mounting the second panel to the support panel in its alternate, selective positions, and
      (2) constructed for rapid engagement and disengagement with the fastening means of the support panel and the fastening alignment means of the second panel,
   whereby the second panel is quickly and easily mounted to the support panel in any one of a plurality of selective positions for effectively extending the zone of protection afforded by the support panel as required by the user.

2. The safety shield defined in claim 1, wherein said first panel is further defined as incorporating additional fastening means mounted along at least one edge thereof for locking interconnected engagment with the cooperating fastening means and the fastening alignment means of the second panel, whereby the second panel is removably attached and selectively repositionably securable in a plurality of alternate orientations and positions directly on the first panel, thereby extending the effective zone of protection afforded by the first panel as required by the user.

3. The safety shield defined in claim 2, further comprising:
   (E) a third panel pivotally mounted to the support panel along an edge opposite the first panel.

4. The safety shield defined in claim 3, wherein the first panel and the third panel are movable through an arc of about 180° relative to the support panel.

5. The safety shield defined in claim 3, wherein said cooperating fastening means comprises elongated screw means extending from an easily employed knob member, and said fastening means of the support panel and said fastening means of the first panel are defined as comprising a plurality of screw-receiving threaded insert means securely mounted in said panels and positioned for threaded engagment with the screw means of said fastening means for cooperative, mounted, sandwiched, anchoring engagement of said second panel therebetween.

6. The safety shield defined in claim 5, wherein said second panel is further defined as having a substantially L-shaped cross section, formed by a substantially flat shield portion having a flange portion positioned along one edge thereof at substantially right angles thereto.

7. The safety shield defined in claim 6, wherein the fastening alignment means of the second panel are further defined as comprising:
   (a) means forming at least one aperture in the flange portion thereof, positioned substantially midway along the flange portion, and
   (b) a plurality of aperture means formed along the free edge of the substantially flat portion opposed to the flange portion.

8. The safety shield defined in claim 7, wherein said plurality of threaded insert means are mounted for cooperative aligned engagement with the apertures formed in the second panel, whereby the second panel is quickly and easily selectively mountable to the support panel or the first panel by threaded engagement of said cooperating fastening means through said aperture means into said threaded insert means.

9. The safety shield defined in claim 3, wherein the first and third panels are further defined as being pivotally mounted to the support panel by a pair of bracket means supportingly engaged therewith at opposed ends thereof.

10. The safety shield defined in claim 9, wherein each of said bracket means is further defined as comprising
   (a) a bracket member fixedly mounted to the support panel, and
   (b) a panel fastening assembly interconnecting a portion of each pivotable panel with the bracket member, thereby imparting the desired arcuate movability to the first and third panels.

11. The safety shield defined in claim 10, wherein said first panel is further defined as incorporating two opposed side flanges extending substantially perpendicularly from the opposed side edges thereof, and said bracket means are further defined as being pivotally interconnected with cooperatively aligned corner portions of said opposed flanges.

12. The safety shield defined in claim 11, wherein said third panel is further defined as incorporating two opposed side flanges extending substantially perpendicularly from the opposed side edges thereof, and said bracket means are further defined as being pivotally interconnected with cooperatively aligned corner portions of said opposed flanges.

13. The safety shield defined in claim 12, wherein the panel fastening assemblies define the pivot axes about which the first and third panels move.

14. The safety shield defined in claim 1, further comprising:
(E) a substantially flat, panel holding collar underlying the support panel member incorporating a substantially annular central portion having an outer diameter dimensioned for mating engagement with the aperture of the support panel, and incorporating
 (a) a centrally disposed aperture dimensioned for peripherally surrounding the rotating cutting tool portion of the machine tool, and
 (b) two screw receiving apertures formed therein and positioned for cooperative alignment with screw receiving threaded apertures of the non-rotating portion of the machine tool.

15. The safety shield defined in claim 1, further comprising:
(E) a substantially flat, panel holding collar member incorporating
 (1) a substantially annular central portion having an outer diameter dimensioned for mating engagement with the aperture rim of the support panel and incorporating
  (a) a centrally disposed aperture dimensioned for peripherally surrounding the rotating cutting tool portion of the machine tool, and
  (b) two screw receiving apertures formed therein and positioned for cooperative alignment with screw receiving threaded apertures formed in the non-rotating portion of the machine tool; and
 (2) support means extending from the outer diameter of the central portion and positioned for cooperative, underlying supporting engagement of the support panel of the safety shield;
whereby the safety shield is pivotally movable about the central axis of the non-rotating portion of the machine tool for positioning in any desired angular orientation, while being supportingly maintained on said support means of the panel holding collar to assure ease of movability into any desired position.

16. The safety shield defined in claim 15, wherein said support means comprises a substantially flat annular ring member having a diameter greater than the diameter of the central portion and the axial thickness of the central portion is less than the thickness of the support panel.

17. A safety shield for mounting to a machine tool which incorporates a non-rotating portion having a rotating cutting tool extending therefrom, said safety shield comprising:

(A) a support panel mounted to the non-rotating portion of the machine tool and incorporating
 (1) a substantially flat rectangular shaped member,
 (2) aperture means formed in the substantially flat rectangular member substantially at the midpoint thereof, for peripherally surrounding the rotating cutting tool, and
 (3) at least one threaded insert securely embedded in said flat rectangular shaped support panel substantially midway along each of two opposed side edges of said panel, in juxtaposed inwardly spaced relationship to the side edge thereof;
(B) a first panel
 (1) pivotally mounted to the support panel, adjacent a third edge, positioned between said two, opposed insert carrying edges, and
 (2) incorporating a plurality of threaded inserts embedded in said first panel at various juxtaposed, cooperating, spaced positions thereabout;
(C) a second panel
 (1) selectively securably mountable to both the support panel and the first panel in any one of a plurality of alternate orientations and positions, and
 (2) incorporating apertures
  (a) formed along two opposed edges of said panel in juxtaposed, inwardly spaced relationship to the terminating edges thereof, and
  (b) positioned for cooperative alignment with the threaded inserts of the support panel and the first panel, thereby extending the zone of protection afforded by the support or the first panel to conform to the particular needs of the user; and
(D) fastening means
 (1) comprising an elongated screw means extending from an easily employed knob member for cooperative, associated, interconnection with the aperture means of the second panel and threaded engagement with the threaded inserts of the first panel and the support panel,
thereby providing rapid engagement and disengagement of the second panel with the first panel and the support panel in any one of a pluraltiy of selected alternate positions and orientations for extending the zone of protection afforded by the support panel and the first panel to conform to the particular needs of the user regardless of the varying nature of these needs.

18. The safety shield defined in claim 17, wherein the second panel is further defined as comprising a substantially L-shape and the aperture means are formed in the terminating edge forming the flange of the L-shaped panel and the opposed terminating edge of the panel.

19. The safety shield defined in claim 17, wherein the threaded inserts are further defined as being embedded in the support panel and in the first panel with the central axis thereof substantially perpendicular to the plane formed by the surface of the panel in which the insert is mounted.

* * * * *